United States Patent
Lebzelter

[11] 3,921,665
[45] Nov. 25, 1975

[54] LIMIT VALVE WITH OVERTRAVEL DETECTOR

[75] Inventor: Joseph Lebzelter, Sparta, N.J.

[73] Assignee: The United States of America as represented by the Secretary of the Army, Washington, D.C.

[22] Filed: Dec. 17, 1974

[21] Appl. No.: 533,561

[52] U.S. Cl. .................. 137/553; 137/557; 251/3; 137/630.22
[51] Int. Cl.² .......................................... F16K 37/00
[58] Field of Search ............. 91/37; 251/3, 85, 277, 251/278, 321; 137/553, 557, 630.22

[56] References Cited
UNITED STATES PATENTS

| | | | |
|---|---|---|---|
| 1,917,182 | 7/1933 | Drager | 137/630.22 X |
| 2,652,071 | 9/1953 | Morrison | 137/630.22 |
| 2,959,190 | 11/1960 | Barnes et al. | 137/553 X |
| 3,024,808 | 3/1962 | Woodruff | 251/3 X |
| 3,344,807 | 10/1967 | Lehrer et al. | 137/557 |

*Primary Examiner*—Henry T. Klinksiek
*Attorney, Agent, or Firm*—Nathan Edelberg; Robert P. Gibson; Thomas R. Webb

[57] ABSTRACT

A fluid limit valve, comprising: a valve body having aligned valve bore and stem counterbore; transverse input and output fluid channels opening into the valve bore; a valve member slidable in the valve bore; and a spring-pressed, telescopic valve extension or stem slidable in the stem counterbore, is provided with means for producing a fluid signal in response to overtravel of the stem and valve member, comprising: a poppet valve counterbore aligned with the valve bore and containing a poppet valve including a cup-shaped poppet cylinder partially closed by a centrally-apertured poppet seat; a headed poppet loosely slidable in the cylinder and seat with a shank thereof extending toward but normally spaced from the valve member, a ring seal between the poppet and the seat, and a coil spring in the cylinder biasing the poppet toward the valve member and compressing the ring seal; fluid channels in the valve body and poppet cylinder wall connecting the interior of the cylinder with an input channel, for pressurizing the cylinder; and a fluid signal channel connected to the closed space between the valve member and the poppet valve; whereby excessive movement of the stem and valve member in overtravel beyond the normal operating stroke of the valve causes the valve member to engage and move the poppet, thereby opening the fluid seal and admitting fluid from the poppet cylinder to the space and fluid signal channel. The stem spring is weaker than the poppet spring, to permit a predetermined amount of overtravel before the poppet valve is opened and the fluid signal is produced. The invention is disclosed as applied to both double and single land valves.

10 Claims, 9 Drawing Figures

OVERTRAVEL WITH PRESSURE SIGNAL AT PORT 99 ical control elements and the fact that pneumatic media are inherently safe in explosion hazard environments. Pneumatic control systems utilize pneumatic limit valves to detect the positions of dynamic machine elements. While these limit valves have inherent high reliability when properly applied, they are usually subject to immediate damage if they are operated beyond the normal operating stroke. Therefore, it is usually necessary to provide limit valves with overtravel devices to allow for possible variations in the operating stroke.

LIMIT VALVE WITH OVERTRAVEL DETECTOR

BACKGROUND AND BRIEF SUMMARY OF THE INVENTION

High reliability pneumatic control systems are extensively employed on automatic production machinery. These systems are often used in ammunition production equipment due to the very high volumes produced which require very reliable control elements and the fact that pneumatic media are inherently safe in explosion hazard environments. Pneumatic control systems utilize pneumatic limit valves to detect the positions of dynamic machine elements. While these limit valves have inherent high reliability when properly applied, they are usually subject to immediate damage if they are operated beyond the normal operating stroke. Therefore, it is usually necessary to provide limit valves with overtravel devices to allow for possible variations in the operating stroke.

An object of the present invention is to provide a fluid limit valve with unique means for producing a signal when it is being operated with a stroke that puts the valve in jeopardy of physical damage. With such a valve system, in the absence of the signal during operation, there can be complete confidence that the valve is not being operated in a damaging way. The new valve system is designed so that the signal is not produced during the normal desired operating stroke of the valve. For a means for monitoring limit valves to be satisfactory, several requirements must be fulfilled:

1. The monitoring means must be very reliable. It must be capable of standing by for long periods of time and responding instantly when it is needed;
2. A failure in the monitoring means must not adversely affect the main function of the valve; and
3. The monitoring means must be compact so that it does not significantly increase the size of the valve.

In accordance with the invention, a fluid valve including a movable valve member having a normal safe operating path and an unsafe overtravel path is provided with: a normally-closed poppet valve, comprising a poppet cylinder and a spring-pressed poppet slidable in the cylinder and positioned to be engaged and moved by the valve member in its overtravel path to open the poppet valve; a source of fluid pressure connected to the interior of the cylinder; and means, responsive to the release of fluid from the cylinder when the poppet valve is opened, for producing a fluid signal indicating the overtravel motion of the valve member.

The invention will be described, for examples, as applied to limit valves of the single-land and double-land (spool) types, with the monitoring means incorporated into a short extension of the main body of the valve.

DETAILED DESCRIPTION OF PREFERRED EMBODIMENTS

Figure 3:
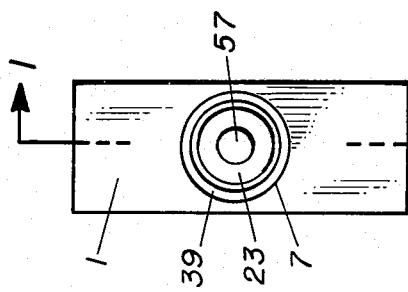
Figure 1:
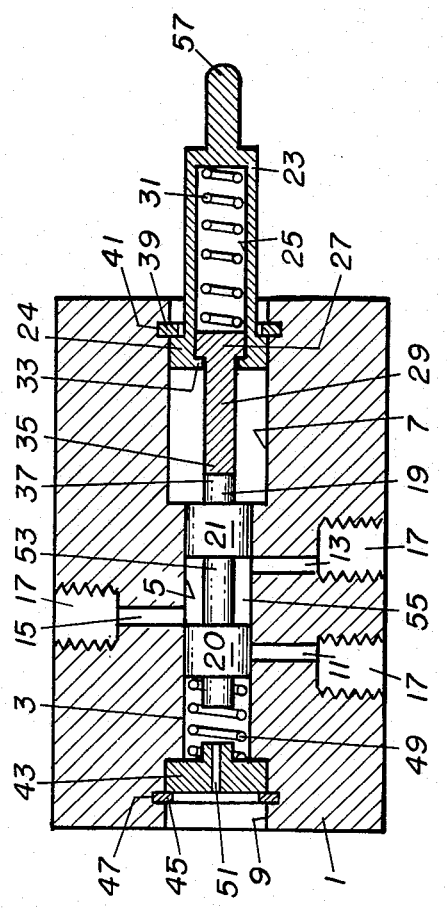
FIG. 1 is an axial sectional view taken on line 1—1 of FIG. 3, and FIGS. 2 and 3 are side and end elevation views, respectively, of a double-land (spool) type limit valve of the prior art.
Figure 2:
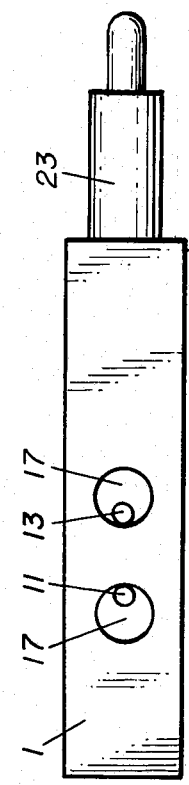

The prior art limit valve shown in FIGS. 1 to 3 comprises a rectangular valve body 1 formed with a longitudinal opening 3, made up of a central cylindrical valve bore 5, a stem counterbore 7 at one end, and a stop counterbore 9 at the other end. Body 1 also has two small input fluid bores or channels 11 and 13 opening into valve bore 5 on one side and a small output fluid bore or channel 15 opening into valve bore 5 on the opposite side, between the two input channels, as shown in FIG. 1. Each of the fluid channels 11, 13 and 15 has a threaded counterbore 17 to receive a threaded tubing or fitting (not shown). A spool-type valve member 19 is slidably mounted in valve bore 5 with two spaced cylindrical lands 20 and 21 snugly fitting within the bore. A stem 23 is slidable in stem bore 7, with a circular head 24 loosely sliding in the bore, and extends outward from the body 3 for actuation by external means, such as machine cam (shown in FIGS. 4 to 8). Stem 23 has a central plunger bore 25 in which the head 27 of a stem plunger 29 loosely slides, with a relatively strong coil spring 31 interposed between head 27 and the base of bore 25. An inward flange 33 on head 24 retains the plunger head 27 in the bore 25. The free end 35 of plunger 29 abuts the adjacent end 37 of valve member 19 in the unactuated condition of the valve shown. Alternatively, the plunger 29 may be an integral extension of valve member 19. The plunger 29 and spring 31 constitute a resilient telescopic connection between the valve member 19 and the stem 23. A stop ring 39 mounted in an annular groove 41 in stem bore 7 limits the outward movement of stem 23. A disc stop 43 is rigidly held in stop bore 9, by a retaining ring 45 mounted in an annular groove 47. The valve member 19 is resiliently held in engagement with the plunger 29 by a relatively weak coil spring 49 interposed between stop 43 and the valve member. The space between stop 43 and valve member 19 is vented by a vent hole 51 through the stop. The two lands 20 and 21 of valve member 19 are connected by a reduced-diameter rod portion 53 leaving an annular space 55 therearound which connects the output fluid channel 15 with one of the two input fluid channels 11 and 13. In the initial position of valve member 19 shown, determined by the location of stop ring 39, output channel 15 is connected with input channel 13 for venting whatever equipment (e.g. a fluid motor) is connected to the output channel. In operation, the input channels 11 and 13 are connected to the same (or different) fluid source (not shown) and the output channel is connected to a fluid load, such as a fluid motor (not shown). When the stem 23 is externally actuated, as by pressure exerted against a rounded end 57 thereof, the stem 23 and strong spring 31 move the plunger 29 and valve member 19 inwardly, to the left in FIG. 1, compressing weak spring 49, until the left end of the valve member contacts the adjacent end of stop 43. In this motion, land 21 closes input channel 13, and land 11 opens input channel 11 to the space 55 and output channel 15, thus actuating the load. If the force which actuates the stem 23 is continued beyond this normal operating path, initial overtravel of the stem is absorbed by compression of spring 31. Still further movement of stem 23 results in damage to the valve parts.

Figure 4:
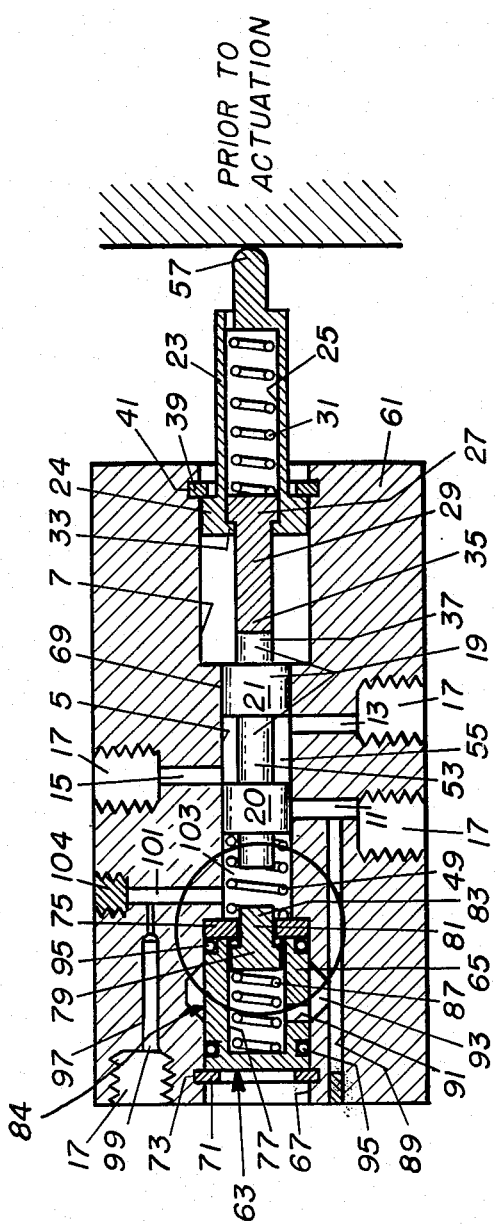
FIG. 4 is an axial sectional view of a spool type limit valve incorporating the present invention.
Figure 5:
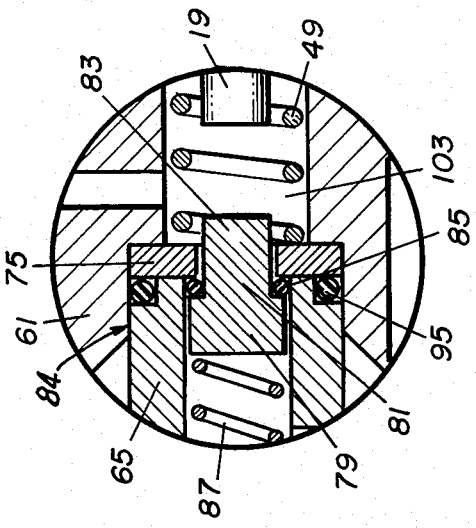
FIG. 5 is an enlargement of the circled portion of FIG. 4.

FIGS. 4 and 5 show a modification of the limit valve of FIGS. 1–3, in accordance with the present invention, to provide means for producing a fluid signal in response to excessive overtravel of the stem 23. The same numerals have been used for elements substantially identical in FIGS. 1 to 5. All of the primary valve structure in FIGS. 4 and 5, that is, the structure to the right of spring 49, is identical to that of FIG. 1, except for incorporation into a modified valve body 61. The valve body has been lengthened somewhat to substitute a poppet valve 63 for the stop 43 of FIG. 1. The poppet valve 63 comprises a cup-shaped poppet cylinder 65 held in an elongated counterbore 67, which forms part of a longitudinal opening 69 in the valve body 61, by a retaining ring 71 mounted in an annular groove 73 in bore 67. Opening 69 also includes the valve bore 5 and stem bore 7. The lands 20 and 21 of valve member 19 snugly fit within the valve bore 5, as in FIG. 1. The open end of poppet cylinder 65 is partially closed by a centrally-apertured retainer disc or poppet seat 75. The interior of poppet cylinder 65 is a cylindrical bore 77 in which the head 79 of a poppet 81 is loosely slidable, with the poppet shank 83 slidable loosely through the poppet seat 75. The poppet cylinder 65 and poppet seat 75 form a poppet guide 84 for the poppet 81 (FIG. 5). A fluid seal between the poppet 81 and the poppet guide 84 is provided by a seal ring 85. A coil spring 87 is interposed between poppet 81 and the base of bore 77 to press the seal ring 85 against the poppet seat 75 under normal operation. The interior of poppet guide 84 is maintained under fluid pressure by means of a fluid bore or channel 89 in valve body 61 connected at one end with input channel 11 (or other fluid pressure source), a fluid channel or bore 91 in the poppet cylinder wall, and an annular groove 93 in valve body 61 communicating with fluid channels 89 and 91. In order to prevent fluid leakage around the exterior of poppet cylinder 65, the cylinder may be tightly fitted within the bore 67, and/or one or more O-ring seals 95 may be provided in the outer surface of the cylinder. The valve body 61 is also formed with a fluid signal bore or channel 97, which may be a pair of connected bores 99 and 101, in the valve body 61 extending from the space 103 between the poppet valve 63 and the valve member 19, for deriving a fluid signal from the valve during excessive overtravel. The outer end of bore 101 is closed by a plug 104.

Figure 6:
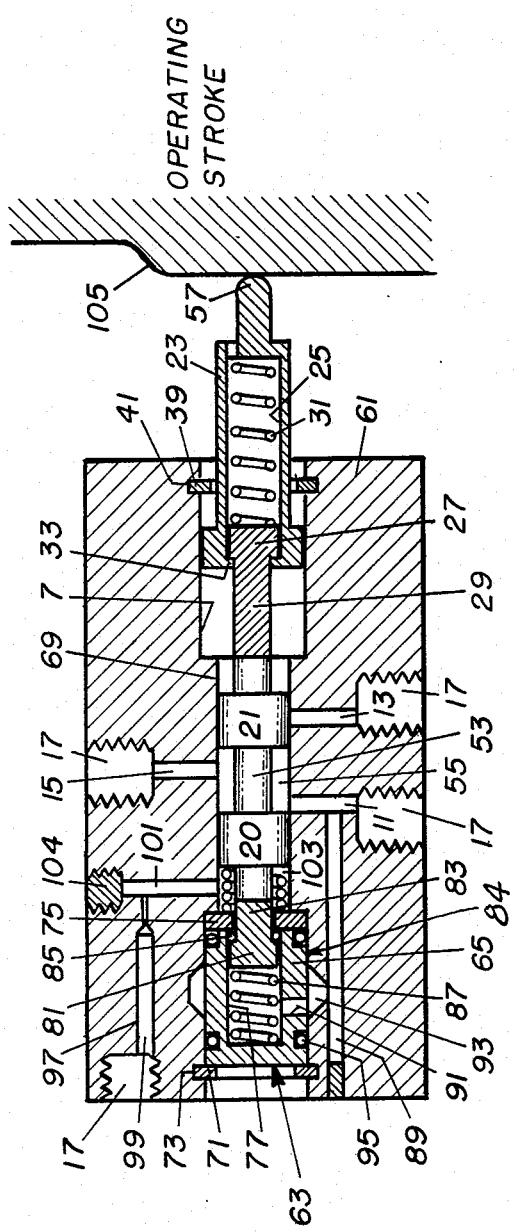
FIGS. 6, 7 and 8 are views similar to FIG. 4 but showing the parts in three other positions.

The normal operation of the improved valve of FIGS. 4 and 5 is the same as that of FIG. 1, except for the fact that, when actuated normally, as by movement of stem end 57 by a cam ramp 105, as shown in FIG. 6, the left end of valve member contacts the poppet 81, instead of stop 43, at or near the end of the normal operating path.

Figure 7:
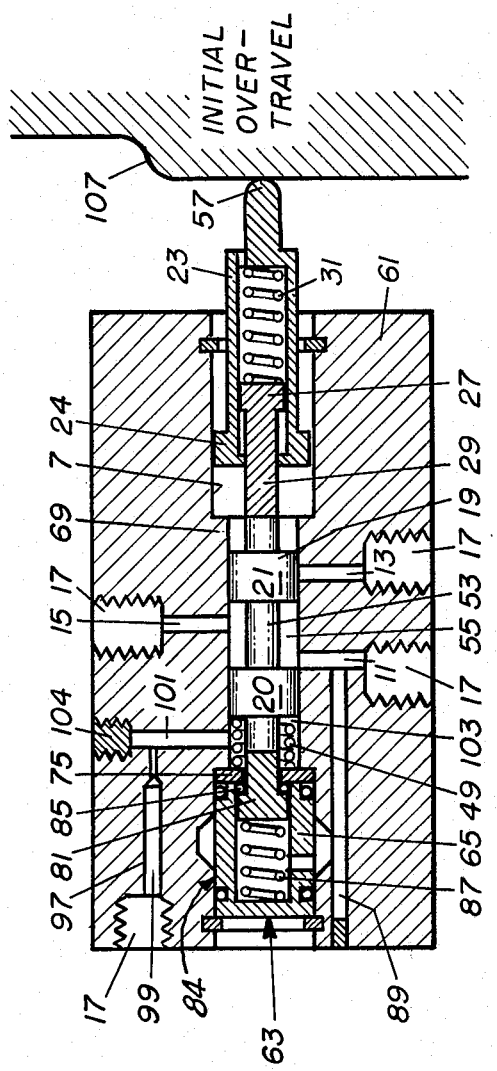

FIG. 7 shows the parts of the improved valve after a given amount of initial overtravel, which might be caused by an additional cam ramp 107 engaging the stem end 57. The plunger spring 31 is weaker than the poppet spring 87, and hence, the additional movement of the stem 23 compresses the plunger spring without moving the poppet 81. Therefore, the fluid seal at 85 remains closed and no appreciable fluid pressure occurs in space 103 to produce a fluid signal from channel 97.

Figure 8:
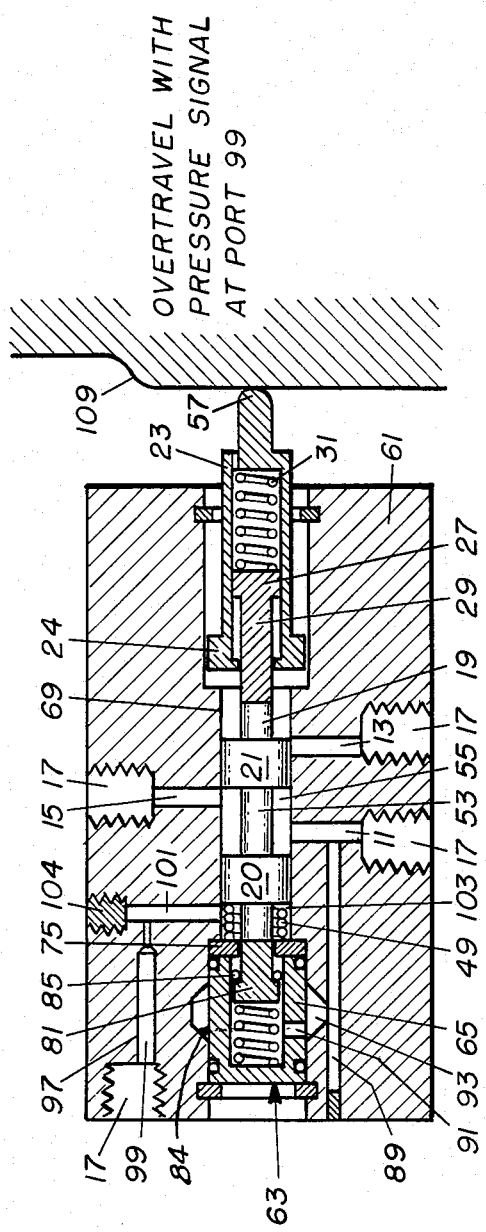

The effect of still further overtravel of valve stem 23, as produced by a further cam ramp 109, is shown in FIG. 8. As the stem 23 is moved beyond the position of FIG. 7, the resistance of plunger spring 31 becomes sufficient to move poppet 81 against poppet spring 87, thus opening the fluid seal at 85 and permitting fluid under pressure to pass between poppet 81 and its guide 84 and into space 103, producing a fluid signal in the form of a pressure pulse through signal channel 97. This signal pulse may be used merely as a warning of unsafe operation, or may be directly utilized to automatically stop the equipment in which the limit valve is incorporated. By a careful choice of springs 31 and 87, the limit valve can be designed to produce the fluid signal at the end of any predetermined overtravel path. The valve spring 49 is a weak spring that does not appreciably affect the operation of the overtravel monitoring means. It will be noted that the additional compression of spring 49 between FIG. 7 and FIG. 8 is very small.

Figure 9:
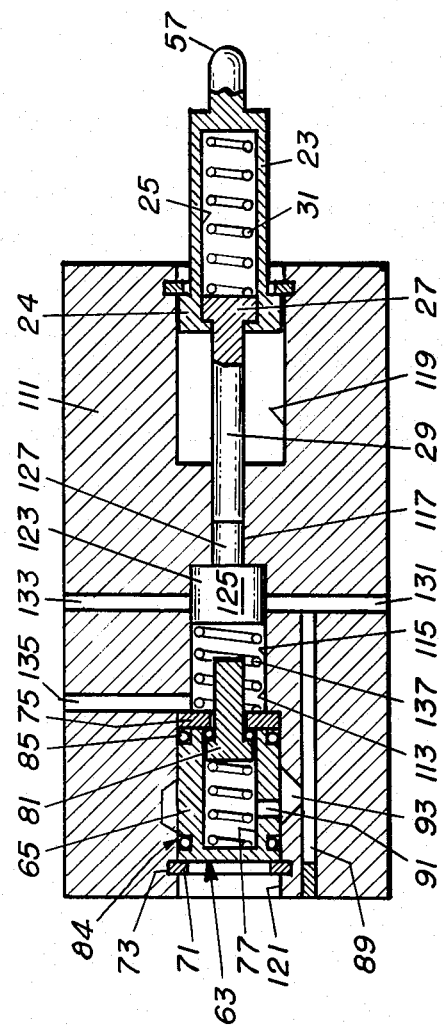
FIG. 9 is an axial sectional view of a single-land limit valve embodying the invention.

The invention is, of course, not limited to the specific spool type limit valve with two input channels shown in FIGS. 1 to 8. FIG. 9 shows a single-land limit valve modified in accordance with the invention. The valve comprises a valve body 111 having a longitudinal opening 113, made up of two cylindrical valve bores 115 and 117 of different diameters, a stem counterbore 119, and a poppet valve counterbore 121. A headed valve 123, comprising a land 125 and shank 127, is slidable in bores 115 and 117 with a snug fit between land 125 and bore 115. Valve 123 may be operated by a stem plunger 29, a stem 23 and a spring 31, as in FIGS. 1-8, slidable in stem counterbore 119. Valve body 111 is formed with an input fluid channel 131 and an output fluid channel 133, aligned with each other and communicating with one end of the valve bore 115, and a fluid signal bore 135 communicating with the other end of valve bore 115. Rigidly mounted in poppet valve counterbore 121 is a poppet valve 63 comprising a poppet guide 84, including a poppet cylinder 65 and poppet seat 75, a poppet 81, a poppet spring 87 in cylinder 65, and a fluid seal ring 85 between poppet 81 and seat 75, as in FIGS. 4–8. A weak valve spring 137, in bore 115 between poppet seat 75 and valve member 123, normally biases the valve member 123 to the closed position shown. The interior of poppet valve 63 is maintained under fluid pressure from the input channel 131 by means of a fluid channel 89, annular groove 93 and fluid channel 91, as in FIGS. 4–8.

The operation of the valve of FIG. 9 is the same as that described for FIGS. 4–8, except for the fact that the main valve is initially closed by land 125, and is opened by movement of the valve land by stem 23, in its normal operating path or stroke, to a position corresponding to that of FIG. 6 wherein the input and output channels 131 and 133 are fully exposed to the annular space surrounding valve shank 127.

Further changes may be made within the spirit of the present invention. For example, the resilient telescopic connection 25, 27, 31 may be replaced by a rigid connection, in which case the fluid signal is produced on the initial overtravel, immediately after the normal operating stroke of the limit valve.

Any suitable materials may be used in the construction of the improved valve. The sliding surfaces of valve bore 5 and valve lands 20 and 21 must be highly polished and of compatible materials. For example, the valve member 19 may be of stainless steel or surface hardened aluminum, and the valve body 1 may be of aluminum or brass with a liner of stainless steel or hardened aluminum in bore 5. The stem 23, retaining rings 39 and springs 31, 49 and 87 are preferably of steel. The poppet cylinder 65, poppet seat 75 and poppet 81 may be of aluminum or brass. The plunger 29 is preferably of steel or brass. The O-rings may be of rubber compressed into annular grooves in the poppet cylinder 65. The seal ring 85 may be of rubber bonded to the head 79 of poppet 81.

The foregoing disclosure and drawings are merely illustrative of the principles of this invention and are not to be interpreted in a limiting sense. I wish it to be understood that I do not desire to be limited to exact details of construction shown and described, because obvious modifications will occur to a person skilled in the art.

What is claimed is:

1. In combination:
   a fluid valve including a movable valve member having a normal safe operating path and an unsafe overtravel path;
   a normally-closed poppet valve comprising a poppet guide and a spring-pressed poppet slidable in said guide and positioned to be engaged and moved by said valve member in its overtravel path to open said poppet valve;
   means for applying fluid pressure to the interior of said guide; and
   means, responsive to the release of said fluid from said guide when said poppet valve is opened by said valve member, for producing a fluid signal indicating the overtravel motion of said valve member.

2. The combination of:
   a fluid valve including a valve body and valve member slidable in said valve body, said valve member having a normal safe operating path and an unsafe overtravel path which may damage said valve; with
   means for detecting the movement of said valve member in said overtravel path, comprising:
      a poppet valve including a poppet guide, containing a poppet and a spring, mounted adjacent to said valve member with said poppet loosely sliding in said guide and positioned in the path of said valve member;
      fluid sealing means between said poppet and said guide operative prior to movement of said poppet by said valve member;
      means for applying fluid pressure to the interior of said guide;
      means forming a chamber between said poppet guide and said valve member; and
      means communicating with said chamber for deriving a fluid pressure signal therefrom;
      said valve and said poppet being so constructed and arranged that said valve member contacts said poppet at the end of its normal operating path, and when said valve member is moved along said overtravel path it moves said poppet against said poppet spring and opens said sealing means, thereby admitting fluid from said guide to said chamber and producing said fluid signal.

3. The combination as in claim 2, wherein said means for applying fluid pressure is a fluid channel connecting said poppet guide with said fluid valve.

4. The combination as in claim 2, wherein:
   said valve includes a valve stem connected to said valve member by a resilient telescopic connection, and adapted to be externally actuated to operate said fluid valve;
   said valve stem has a safe overtravel path between said operating path and said unsafe overtravel path; and
   the relative strengths of said poppet spring and said resilient connection are such that, during said safe overtravel path of said stem beyond said operating path, said connection is telescoped to prevent movement of said poppet and production of said fluid signal.

5. A fluid limit valve system comprising:
   a valve body having a main bore, and at least two fluid control channels communicating with said main bore;
   a valve member including a land slidable in said main bore for cooperation with said channels;
   a valve stem connected to said valve member and extending outwardly from said body for external actuation thereof;
   means for limiting the outward extension of said stem;
   means biasing said valve member toward said valve stem;
   a poppet guide, containing a poppet and a spring, mounted in said body with said poppet loosely sliding in said guide and extending into said main bore for coaction with said valve member;
   fluid sealing means between said poppet and said guide operative prior to movement of said poppet by said valve member;
   an additional fluid channel in said body connecting one of said control channels with the interior of said poppet guide;
   a fluid signal channel in said body communicating with the space between said valve member and said poppet guide;
   said control channels and said valve member being so constructed and arranged that, when moved a given distance by said stem in its normal operating stroke, said valve member connects two of said control channels together and then contacts said poppet, and on overtravel of said stem, said valve member moves said poppet against said poppet spring and opens said sealing means, thereby admitting fluid from said guide to said space and producing a fluid signal at said signal channel.

6. A valve system as in claim 5, wherein said valve member is connected to said stem by a resilient telescopic connection; the relative strengths of said poppet spring and said resilient connection being such that, on initial overtravel of said stem, said connection is telescoped to prevent movement of said poppet and production of said fluid signal.

7. A valve system as in claim 5, comprising a spool-shaped valve member and three control channels, one input, one output and one vent; the vent channel being connected to the output channel prior to actuation of said valve stem; and the input channel being connected to the output channel by said operating stroke.

8. A fluid limit valve structure comprising:
   a valve body having axially-aligned stem, valve and poppet guide bores, a fluid signal channel, and at least two fluid control channels communicating with said control valve bore;
   valve means including a valve member comprising at least one land slidable in said valve bore for cooperation with said control channels, and a headed valve plunger abutting said valve member and extending into said stem bore;
   a valve stem in said stem bore and extending outwardly from said body for external actuation thereof and comprising an axial plunger bore in which said plunger head is slidable, a plunger spring interposed between said plunger head and the base of said plunger bore, and a head on said stem slidable in said stem bore;

retaining means in said stem bore limiting the outward extension of said stem;

a cup-shaped poppet guide mounted in said poppet guide bore with its open end adjacent to said valve bore; said guide and said valve body being formed with an additional channel connecting the interior of said guide with one of said control channels;

a poppet loosely slidable in said guide;

a poppet spring in said guide biasing said poppet to extend initially into said valve bore for coaction with said valve member;

a fluid seal between said poppet and said guide, operative when said poppet is in its initial extended position; and a valve spring in said valve bore in the space between said land and said poppet guide; said signal channel communicating with said space;

said control channels and said valve member being so constructed and arranged that, when moved a given distance in said body by said stem in its operating stroke, said valve member connects said control channels together and then contacts said poppet;

the relative strengths of said springs, and the fluid pressure in said poppet guide, being such that, on initial overtravel of said stem, said stem compresses said plunger spring without moving said poppet, and on further overtravel, said stem and said valve member compress said poppet and valve springs and move said poppet, thereby opening said fluid seal to allow fluid to flow from said guide into said space, producing a fluid signal at said signal bore.

9. A valve structure as in claim 8, wherein a central portion of said valve member extends beyond said land and into said space.

10. A valve structure as in claim 8, wherein said valve member includes two spaced lands which cooperate with three control channels to produce two separate fluid paths through said valve, one being a vent path existing prior to actuation of said stem and the other being a control path established by said operating stroke.

* * * * *